Dec. 13, 1966   J. L. FLANAGAN   3,291,912
ARTIFICIAL LARYNX
Filed April 18, 1963   4 Sheets-Sheet 1

INVENTOR
J. L. FLANAGAN
BY Jules P. Kirsch
ATTORNEY

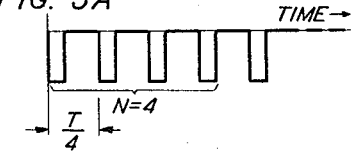
FIG. 3A
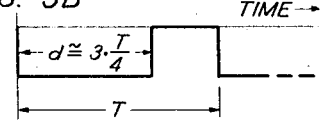
FIG. 3B
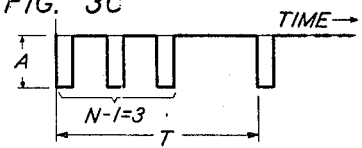
FIG. 3C
FIG. 3D
AMPLITUDE SPECTRUM
OF PULSE TRAIN OF
FIG. 3C
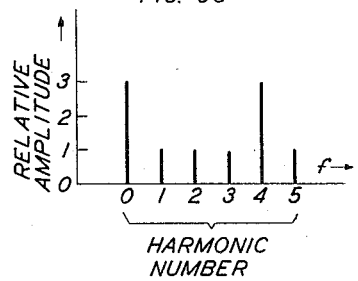
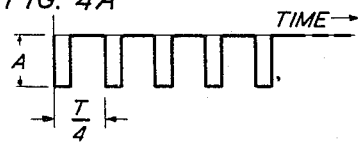
FIG. 4A
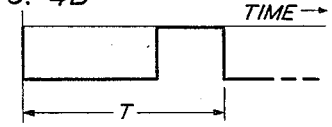
FIG. 4B
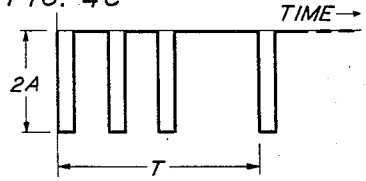
FIG. 4C
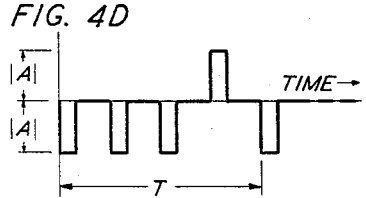
FIG. 4D
FIG. 4E
AMPLITUDE SPECTRUM
OF PULSE TRAIN OF
FIG. 4D
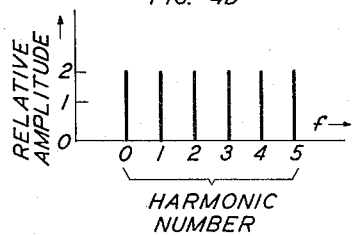
FIG. 5
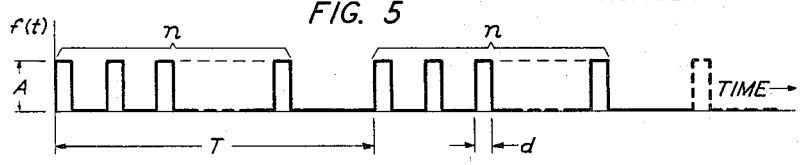

Dec. 13, 1966  J. L. FLANAGAN  3,291,912
ARTIFICIAL LARYNX
Filed April 18, 1963  4 Sheets-Sheet 3

Dec. 13, 1966   J. L. FLANAGAN   3,291,912
ARTIFICIAL LARYNX
Filed April 18, 1963                                   4 Sheets-Sheet 4

ARTIFICIAL LARYNX
James L. Flanagan, Warren Township, Somerset County,
N.J., assignor to Bell Telephone Laboratories, Incorporated, New York, N.Y., a corporation of New York
Filed Apr. 18, 1963, Ser. No. 273,962
7 Claims. (Cl. 179—1)

This invention relates to artificial larynges that introduce artificial sound into a user's vocal tract by displacing the outer wall of the user's throat, and in particular to apparatus for increasing the output volume of the artificial sound introduced by such artificial larynges.

The normal source of sound for the production of human speech is provided by the vocal cords, which introduce sound into the vocal tract by releasing puffs of air from the lungs into the vocal tract. The sound thus introduced by the vocal cords is formed into speech by the human articulatory mechanism, which includes the resonating action of the cavities of the pharynx, mouth, and nose, and constrictions at certain points in the vocal tract.

When the normal source of sound for human speech is lost, through either paralysis or removal of the vocal cords, the ability to speak may be regained by utilizing any one of a number of substitute sound sources, also referred to as artificial larynges, which introduce into the vocal tract artificial sound from which intelligible speech may be formed by the articulatory mechanism. One such artificial larynx is described in H. L. Barney Patent 3,072,745, issued January 8, 1963, in which artificial sound is introduced into the vocal tract by externally displacing the outer wall of the throat. Displacement of the throat wall is accomplished by a vibratory electroacoustic transducer which is excited by a periodic train of brief pulses of electrical current to deliver a corresponding train of periodic pulses of volume displacement to the thoat wall, thereby introducing artificial sound into the vocal tract.

Although the magnitude of the output volume of the artificial sound obtainable from an artificial larynx of the type described in the above-mentioned Barney patent is limited, it is sufficient for a user to produce intelligible speech in ordinary acoustic environments. In noisy environments, however, it has been found that the intelligibility of speech produced by a user of an artificial larynx of this type is impaired by the presence of noise, because of the limited magnitude of the output volume of the artificial sound intrduced by such an artificial larynx.

A general purpose of the present invention is to increase the magnitude of the output volume of artificial sound obtainable from an artificial larynx that externally displaces the throat wall, in order to enable a user to speak intelligibly in noisy as well as quiet acoustic environments.

In the artificial larynx described in the above-identified Barney patent, a specific embodiment of the transducer that displaces the throat wall to introduce sound into the vocal tract is an electromagnet together with a diaphragm that vibrates in response to the output current pulses of an oscillator. In the absence of pulses, the permanent magnetic field of the transducer attracts the diaphragm toward the pole pieces of the electromagnet, whereas the application of current pulses, which oppose the magnetic field, to the coils of the electromagnet releases the diaphragm briefly to spring outward and thereby displace the throat wall. The magnitude of the displacement imparted to the throat wall by the action of the diaphragm depends upon both the strength of the magnetic field and the amplitudes of the opposing current pulses. For an electromagnetic transducer with a predetermined permanent magnetic field, however, application of pulses having amplitudes greater than that necessary to overcome completely the permanent magnetic field does not increase the magnitude of the displacement imparted to the throat wall by the diaphragm. Moreover, in artificial larynges employing electromagnetic transducers, it is sometimes neither desirable nor possible to increase the strength of the permanent magnetic field.

The artificial larynx of the present invention provides an artificial sound of sufficient magnitude to produce intelligible speech in a noisy environment by exciting an electromagnetic transducer with a periodic train of pulses in which each period contains more than one relatively brief pulse, and in which no individual pulse has sufficient amplitude to overcome completely the permanent magnetic field of the transducer. In comparison with previously known artificial larynges, in which an electromagnetic transducer is excited by a periodic pulse train having a single brief pulse in each period, the increased number of pulses in each period of the pulse train employed in the present artificial larynx causes an electromagnetic transducer to impart a greater amount of displacement to a user's throat wall in each period, thereby increasing the magnitude of the output volume of the artificial sound introduced into a user's vocal tract.

Another feature of the present invention is a provision for adjusting the output volume of the sound introduced into the vocal tract to adapt the user's speech to a variety of acoustic environments. This may be accomplished by either varying the number of pulses generated in each period or generating a fixed number of pulses in each period and adjusting the amplitudes of the fixed number of pulses. In a specific embodiment of the principles of this invention, the output volume of the artificial sound is adapted to the acoustic environment by generating a fixed number of pulses in each period which may be adjusted in amplitude by the user.

A further feature of this invention enables the user to vary the length of the period of the pulse train to correspond to a selected range of pitch periods of human voices, thereby introducing into a user's vocal tract artificial sound from which speech of varying pitch may be produced.

An additional feature of this invention is the variety of speech quality which may be obtained by rearranging the pulses in each period of the pulse train to produce artificial sound having a particular kind of amplitude spectrum. Thus the frequency components of the artificial sound spectrum may be made relatively uniform in amplitude by generating a pulse train having four pulses in each period, where the intervals between pulses in each period are a function of the period of the pulse train, and in which the first three pulses in each period are of one polarity and the fourth pulse is of opposite polarity. Alternatively, frequency components lying within selected frequency ranges may be suppressed by generating a pulse train in which the intervals between pulses in each period are independent of the period of the pulse train.

The invention will be fully understood from the following detailed description of illustrative embodiments thereof, taken in connection with the appended drawings, in which.

Figure 1:
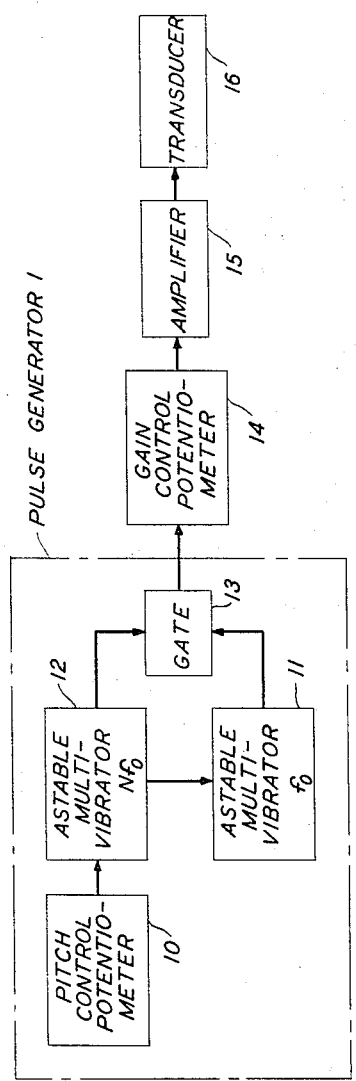
FIG. 1 is a block diagram showing an artificial larynx embodying the principles of this invention.
Figure 2:
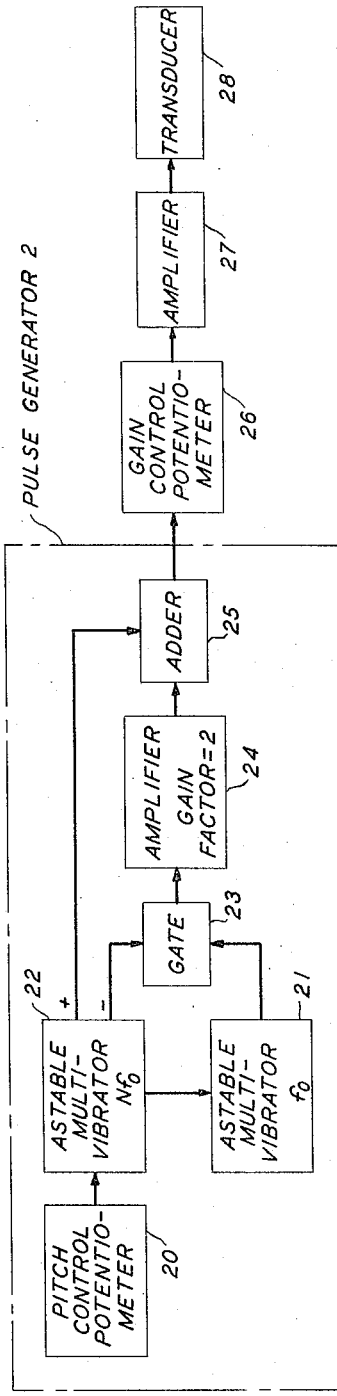
FIG. 2 is a block diagram showing another artificial larynx embodying the principles of this invention.
Figure 6:
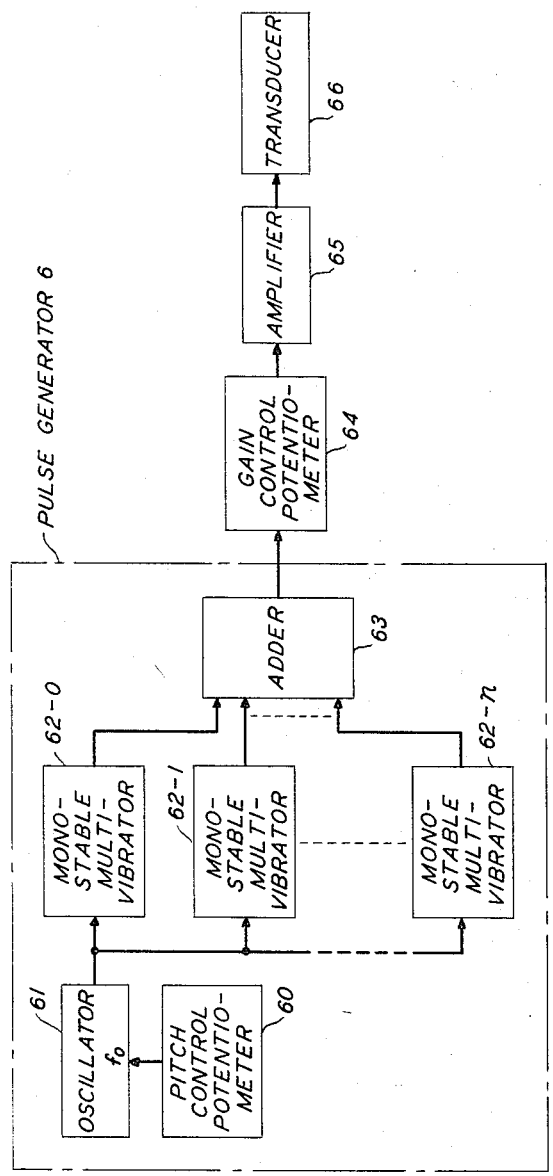
Figure 7:
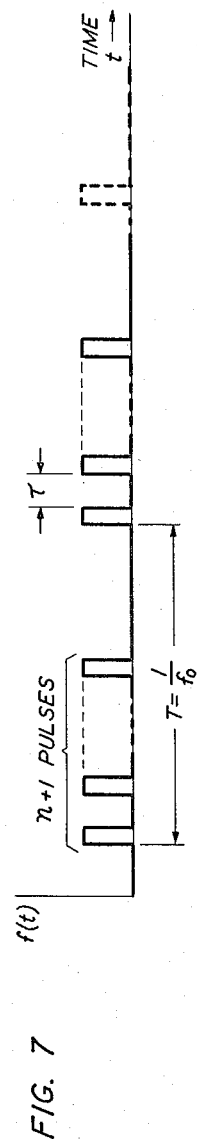

FIGS. 3A, 3B, 3C, and 3D are graphs of assistance in explaining the operation of the apparatus shown in FIG. 1;

FIGS. 4A, 4B, 4C, 4D, and 4E are graphs of assistance in explaining the operation of the apparatus shown in FIG. 2;

FIG. 5 is another graph of assistance in explaining the principles of this invention;

FIG. 6 is a block diagram showing still another artificial larynx embodying the principles of this invention;

FIG. 7 is a graph of assistance in explaining the operation of the apparatus illustrated in FIG. 6; and FIGS. 8A, 8B, 8C, and 8D are additional graphs of assistance in explaining the principles embodied by the apparatus shown in FIG. 6.

*Theoretical considerations*

The root-mean-square value of a periodic wave $f(t)$ is defined to be $$f_{R.M.S.} = \left[ \frac{1}{T} \int_{-\frac{T}{2}}^{\frac{T}{2}} f^2(t) dt \right]^{1/2} \quad (1)$$

where T is the duration of a single period of $f(t)$. For a periodic wave having in each period $n$ rectangular pulses of amplitude A and width $d$, as shown in FIG. 5, the root-mean-square value of the wave may be calculated by applying Equation 1 to obtain the following expression:

$$f_{R.M.S.} = \left[ \frac{n \cdot A^2 \cdot d}{T} \right]^{1/2} \quad (2)$$

From Equation 2 it is evident that the root-mean-square value of a wave of the type shown in FIG. 5 is directly proportional to the square root of the number of pulses, denoted $n$, in each period. For example, the root-mean-square value of a wave containing $n=4$ pulses in each period is twice the root-mean-square value of a wave containing $n=1$ pulse in each period, where it is understood that the other parameters in Equation 2 are the same for both waves.

The artificial larynx provided by the present invention displaces the throat wall of a user with an electromagnetic transducer excited by a periodic current wave containing more than one pulse, i.e., a plurality of $n$ pulses, $n=2,3,\ldots$, in each period to produce a greater sound output volume in the user's vocal tract than is obtainable with an artificial larynx employing an electromagnetic transducer excited by a current wave containing a single pulse in each period. The ideal value of the increase in sound output volume obtainable with the present artificial larynx is specified by Equations 1 and 2, but of course the theoretical value is not fully realized because of transmission losses through the throat wall. Despite these losses, however, the increase in sound output volume provided by the artificial larynx of this invention is substantial and perceptible.

*Apparatus*

Turning now to FIGS. 1 and 2, these drawings illustrate two versions of the artificial larynx of this invention. In both of these drawings, the individual components are shown in block diagram form, and the signal paths are shown by single lines in order to avoid unnecessary complexity. To those skilled in the art, the construction of these components and the points at which power must be supplied and interconnections must be made will be obvious from the following description.

Referring first to FIG. 1, pulse generator 1 produces a periodic pulse train in which each period contains more than one pulse, and in which all of the pulses in each period are of the same polarity. Within generator 1, there is provided a pair of conventionally constructed oscillators, for example, astable multivibrators 11 and 12, which are synchronized in well-known fashion so that the frequency of oscillation of one multivibrator, for example, multivibrator 12, is N times the frequency of oscillation, denoted $f_0$, of the other multivibrator, say multivibrator 11, where N is an integer and $N>2$. The pulse trains produced by multivibrators 11 and 12 are led to a gate 13, which may be a conventional transmission gate provided with an input terminal, a control terminal, and an output terminal. The higher frequency pulse train is applied to the input terminal of gate 13, and the lower frequency pulse train is applied to the control terminal of gate 13. By making the slower running multivibrator 11 suitably asymmetrical, the periods of the lower frequency pulse train will be correspondingly asymmetrical, as illustrated in FIG. 3B, and gate 13 will operate to transmit $N-1$ out of every N pulse from multivibrator 12. For example, as shown in FIG. 3B, the periods of the lower frequency pulse train generated by multivibrator 11 are made sufficiently asymmetrical so that the duration $d$ of the pulse in each period is substantially equal to the duration $N-1=3$ periods of the higher frequency pulse train generated by multivibrator 12. The resulting pulse train appearing at the output terminal of pulse generator 1 will therefore have a fundamental period equal to that of the lower frequency pulse train, and each period will contain $N-1$ pulses.

The operation of pulse generator 1 is illustrated graphically in FIGS. 3A, 3B, and 3C for the specific case in which $N=4$. Thus FIG. 3A represents a typical pulse train produced by multivibrator 12 at a frequency $4f_0$, or equivalently, with a period $T/4$, where FIG. 3B shows the asymmetrical periods of the lower frequency pulse train produced by multivibrator 11 at a frequency $f_0$, or period T, where $$f_0 = \frac{1}{T}$$

FIG. 3C illustrates the pulse train transmitted by gate 13 to the output terminal of generator 1, in which the period of the train is T, and the number of pulses in each period, $N-1$, is equal to three.

Returning to FIG. 1, the pulse train from generator 1 is passed through conventional gain control potentiometer 14 and amplifier 15 to transducer 16. Transducer 16 is preferably of the electromagnetic variety described in the previously mentioned Barney patent, and by holding the diaphragm of the transducer in contact with a portion of the user's throat wall, the incoming pulses, whose polarity is made to oppose that of the magnetic field, release the diaphragm to spring outward and displace the throat wall, thereby introducing artificial sound into the user's vocal tract.

The setting of potentiometer 14 is controlled by the user to adjust the amplitudes of the pulses from generator 1 so that the user may adapt his speech volume to a range of acoustic environments. Thus in a noisy environment, the pulse amplitudes may be increased to cause the transducer diaphragm to impart greater displacement to the user's throat wall, thereby introducing into the user's vocal tract an artificial sound wave of correspondingly greater magnitude, while in a quiet environment the artificial sound wave magnitude may be reduced by decreasing the pulse amplitudes. The upper limit on the range of pulse amplitudes is determined by the strength of the permanent magnetic field of the magnetic transducer, because no further increase in throat wall displacement is obtained by using pulses of amplitude greater than that required to cancel completely the permanent magnetic field.

The fundamental frequency, $f_0$, or its reciprocal, the fundamental period, T, of the pulse train from generator 1 may be varied by the user over a range of values corresponding to an appropriate pitch range for natural human speech sounds; for example, the user may vary $f_0$ within a pitch range from 100 to 200 cycles per second. Pitch control is effected by providing generator 1 with a pitch control potentiometer 10 which may be adjusted by the user to control the frequency of oscillation, $Nf_0$, of multivibrator 12, thereby simultaneously controlling the frequency, $f_0$, of multivibrator 11.

It is well established that one of the important requirements for the production of good quality speech with an artificial larynx is the introduction into the vocal tract of artificial sound having a relatively flat amplitude spectrum; that is, the amplitudes of the frequency components of the artificial sound spectrum must be relatively uniform within a frequency range sufficiently wide to define a variety of speech sounds. In addition, it is desirable from the standpoint of economy to minimize the current drain on the energy source, which typically comprises small batteries having a limited lifetime. Accordingly, the width of the pulses produced by generator 1 is made relatively narrow, a suitable width being on the order of 200 to 800 microseconds and preferably on the order of 500 microseconds. These two objectives may be partially realized by proportioning the elements of multivibrator 12 in well-known fashion to produce a pulse train in which each of the individual pulses has a specific width within the above limits.

However, even with the above limitation on pulse width, the quality of speech produced from a pulse train of the type shown in FIG. 3C is not entirely satisfactory from a subjective standpoint. Analysis of the amplitude spectrum of the pulse train of FIG. 3C reveals that the relative amplitudes of the frequency components are not uniform, as illustrated in FIG. 3D, and it appears that it is this nonuniformity, if sufficiently pronounced, that ordinarily impairs the subjective quality of speech obtained from the artificial larynx illustrated in FIG. 1.

An alternative embodiment of this invention, as illustrated in FIG. 2, introduces into the user's vocal tract an artificial sound having not only a substantial output volume but also frequency components that are relatively uniform in amplitude, thereby enabling the user to produce intelligible, good quality speech in a wide variety of acoustic environments. This is accomplished by providing an artificial larynx with a pulse generator 2 that produces a periodic pulse train in which each period contains $N=4$ pulses, but in which the polarities of the pulses are arranged so that three of the pulses are of one polarity and the remaining pulse is of the opposite polarity. Specifically, the polarity of the first three pulses in each period is selected to oppose the magnetic field of the transducer, while the remaining pulse is given an opposite polarity. An example of a pulse train having this configuration is illustrated graphically in FIG. 4D, and FIG. 4E shows the amplitude spectrum of the pulse train of FIG. 4D, in which it is observed that the frequency components of the pulse train are uniform in amplitude.

Apparatus for generating a pulse train of the configuration shown in FIG. 4D is illustrated in FIG. 2 by pulse generator 2. Two oscillators, for example, astable multivibrators 21 and 22, are synchronized in well-known fashion so that the output pulse train of multivibrator 21 has a fundamental frequency, $f_0$, which is one-fourth that of the fundamental frequency of the output pulse train of multivibrator 22. The frequency of oscillation of multivibrators 21 and 22 is set by the user by means of a pitch control potentiometer 20; that is, potentiometer 20 sets the frequency of oscillation of multivibrator 22 so that the synchronized pulse train generated by multivibrator 21 has a fundamental frequency lying within the frequency range mentioned above.

From multivibrator 22 there is obtained two pulse trains identical in every respect except polarity; that is, one pulse train is taken from the output terminal labeled "+" and led to the first of the two input terminals of adder 25, while the other pulse train, which is opposite in polarity to the pulse train taken from the "+" terminal, is taken from the output terminal labeled "−" and led to the input terminal of gate 23. Gate 23, which may be similar in construction to gate 13 in FIG. 1, is also provided with a control terminal to which the pulse train from multivibrator 21 is applied. The pulse train from the "−" terminal of multivibrator 22 is shown graphically in FIG. 4A, and the pulse train from multivibrator 21 is shown in FIG. 4B. As in the apparatus of FIG. 1, multivibrator 21 is constructed to produce a train of pulses each having a width substantially equal to three periods of the pulse train generated by multivibrator 22 so that gate 23 transmits three out of every four pulses from multivibrator 22.

The pulses transmitted by gate 23 are passed to conventional amplifier 24, which is provided with a gain factor equal to two in order to increase the amplitude, denoted A, of each incoming pulse by a factor of two, as shown in FIG. 4C. The increased amplitude pulses from amplifier 24 are delivered to the second of the two input terminals of adder 25, where they are additively combined with the opposite polarity pulses applied to the first input terminal of adder 25 from multivibrator 22. In each period, T, of the pulse train from amplifier 24 there are three pulses each of amplitude 2A and one polarity, while in the corresponding interval of time in the pulse train from the "+" terminal of multivibrator 22 there are four pulses each of amplitude A and opposite polarity. Therefore, the additive combination formed at the output terminal of adder 25 is a pulse train that has the configuration shown in FIG. 4D. That is, the periodic pulse train passed by adder 25 to the output terminal of generator 2 has four pulses in each period, and the first three of these pulses are of one polarity while the fourth pulse is of the opposite polarity. Moreover, all of the pulses have the same absolute magnitude, denoted |A| in FIG. 4D.

From generator 2, the pulse train is passed through conventional gain control potentiometer 26 and amplifier 27 to transducer 28, thereby exciting the transducer to displace the user's throat wall and introduce artificial sound into the user's vocal tract. As in the apparatus shown in FIG. 1, gain control potentiometer 26 is adjusted by the user to increase or decrease the amplitudes of the pulses to adapt the output volume of the sound introduced into the user's vocal tract to a relatively wide variety of acoustic environments.

It has been determined that $N=4$ is a suitable number of pulses in each period of the pulse train produced by generator 2, where the polarity of each of the first three pulses in each period is made to oppose the magnetic field of the transducer, and the polarity of the fourth pulse is made opposite to the polarity of each of the first three pulses. It is to be understood, however, that the apparatus of FIG. 2 may be adapted to produce pulse trains using other values of N for exciting transducer 28 to introduce artificial sound having sufficient output volume and frequency components of relatively uniform amplitudes.

*Further theoretical considerations*

In the apparatus shown in FIGS. 1 and 2 and explained in detail above, the spacing of the pulses in each period of the pulse train that excites the transducer is a function of the fundamental frequency $f_0$, or its reciprocal, the fundamental period, T. Thus for a fixed pulse width and a fixed number of pulses in each period, the interval between pulses in each period varies with changes in the length of the period because under these conditions changing the frequency with which pulses are generated by the faster running multivibrator alters only the spacing between pulses within each period. For example, increasing the frequency of oscillation of the faster running multivibrator in the embodiments shown in FIGS. 1 and 2 shortens the length of the fundamental period, T, hence with a predetermined number of pulses of fixed width in each period the interval between pulses in each period is decreased. On the other hand, decreasing the frequency of oscillation of the faster running multivibrator in these embodiments lengthens the fundamental period, hence with a predetermined number of pulses of fixed width in each period the interval between pulses in each period is increased.

It may be desirable, however, to excite the transducer with a pulse train in which the spacing between pulses in each period is independent of the length of the fundamental pulse train period, in order to introduce into the vocal tract of a user an artificial sound having a nonuniform amplitude spectrum in which frequency components falling within certain regions of this spectrum tend to be suppressed. For example, artificial sound having this kind of amplitude spectrum may be preferred by users who wish to produce distinctive speech with an artificial larynx.

Figure 8A:
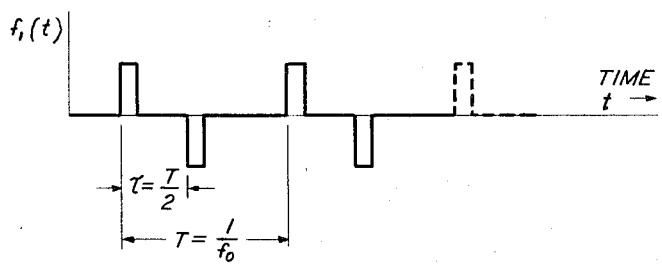
Figure 8B:
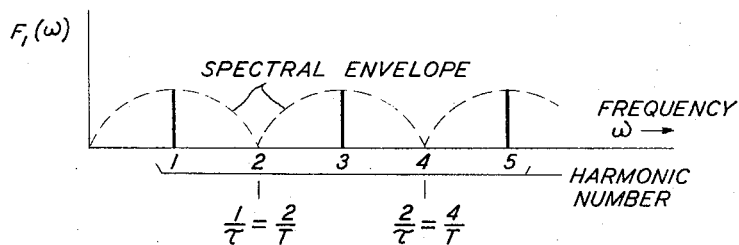
Figure 8C:
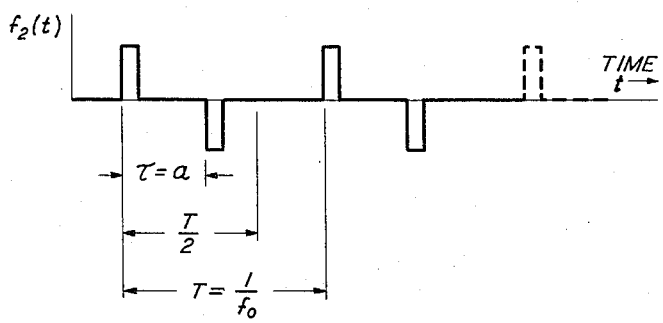
Figure 8D:
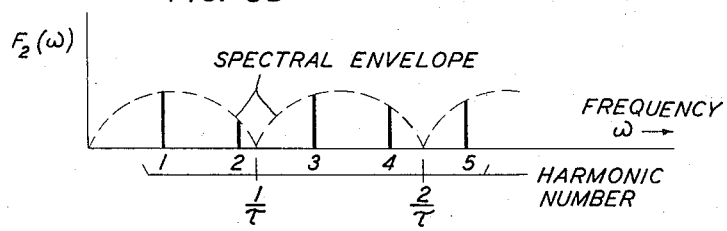

In order to illustrate the effects on the artificial sound spectrum of the relationship between pulse spacing and pulse train period, FIGS. 8A and 8B have been provided to demonstrate a pulse train and its spectrum in which pulse spacing is a function of pulse train period, and FIGS. 8C and 8D have been provided to demonstrate a pulse train and its spectrum in which pulse spacing is independent of pulse train period. For convenience, the illustrated examples show a pulse train in which each period contains two pulses of opposite polarity, but it will be apparent to those skilled in the art that the principles illustrated by these examples are equally applicable to pulse trains containing a greater number of pulses in each period.

Turning first to FIG. 8A, this drawing shows a pulse train $f_1(t)$ in which the spacing between pulses in each period, denoted $\tau$, is made equal to a fixed proportion of the length of the period, T; specifically, $\tau$ is made equal to one-half of T $$\tau = \frac{T}{2}$$

Thus this pulse train represents the kind of pulse train generated by pulse generators 1 and 2 in the embodiments shown in FIGS. 1 and 2, since the spacing between the two pulses of each period shown in FIG. 8A varies with changes in the length of the period T to produce an interval between pulses which is always equal to $T/2$. The amplitude spectrum of $f_1(t)$, denoted $$F_1(\omega), \omega = \frac{2\pi}{T}$$

is shown in FIG. 8B, in which it is observed that the amplitudes of the frequency components are uniform, that is, odd harmonics 1, 3, 5, . . . , have uniform uniamplitudes, while even harmonics 2, 4, . . . , have uniform zero amplitudes. The important feature illustrated by FIG. 8B is that the amplitudes of the harmonics do not vary with changes in the period T because the shape of the spectral envelope varies with the period T so that zeros of the envelope always occur at an even multiple of T; for example, if the period is increased, the harmonics in FIG. 8B are closer together, but the zeros of the spectral envelope still occur at the even harmonics, $$\frac{1}{\tau} = \frac{2}{T} = 2f_0, \frac{2}{\tau} = \frac{4}{T} = 4f_0, \ldots$$

hence the relative amplitudes of the harmonics remain unchanged despite changes in T.

In contrast, FIG. 8C illustrates a pulse train, denoted $f_2(t)$, having two pulses of opposite polarity in each period, in which the spacing $\tau$ between pulses in each period is a constant that is independent of the period T; for example, $\tau$ is made equal to $a$, where for the value of T shown in FIG. 8C, $a < T/2$. The amplitude spectrum of $f_2(t)$, denoted $F_2(\omega)$, is shown in FIG. 8D, and with $\tau$ independent of T, the shape of the spectral envelope remains fixed; for example, the zeros occur at $1/\tau$ as in FIG. 8B, but unlike the spectrum shown in FIG. 8B, $\tau$ is a constant in the spectrum of FIG. 8D, which means that the zeros of the spectral envelope remain fixed despite changes in the period, T. Because the spectral envelope remains fixed, variations in the period, T, are accompanied both by changes in the position on the frequency scale of the harmonics and by changes in the amplitudes of the harmonics, the amplitudes of the harmonics depending upon the positions of the harmonics relative to the spectral envelope. Thus a frequency component that occurs at or near a peak in the spectral envelope has a relatively large amplitude, while a frequency component that occurs in the vicinity of a zero has a relatively small amplitude.

*Alternative apparatus*

The nonuniformity in frequency component amplitudes shown in FIG. 8D may be realized in the amplitude spectrum of the artificial sound introduced into a user's vocal tract by the artificial larynx shown in FIG. 6, described in detail below. By properly choosing the fixed spacing $\tau$ between pulses in each period, the zeros of the spectral envelope of the artificial sound may be made to fall between selected frequency ranges, so that unwanted frequency components may be suppressed; for instance, components that do not contribute to defining the principal formants of the speech produced from the artificial sound may be suppressed.

Turning now to FIG. 6, this drawing illustrates an artificial larynx in which the transducer is excited by a pulse train containing a plurality of pulses in each period, where the spacing between pulses in each period is a predetermined constant that is independent of variations in the length of the period. A pulse train characterized by this kind of fixed spacing between the pulses in each period is generated by pulse generator 6, from which the pulse train is passed through gain control potentiometer 64 and amplifier 65 to excite transducer 66. Potentiometer 64 and amplifier 65, which may be similar in design to the corresponding elements of the apparatuses shown in FIGS. 1 and 2, serve to adjust the amplitudes of the pulses in each period in order to enable the user to adapt the volume of the artificial sound introduced into his vocal tract to a relatively wide variety of acoustic environments. In addition, transducer 66 may be of the electromagnetic type described above.

Within pulse generator 6, oscillator 61, which may be a conventional free-running multivibrator, is adjusted by the user through pitch control potentiometer 60 to produce a pulse train having a fundamental frequency, $f_0$, that lies within a predetermined range of values corresponding to selected pitch frequencies of the human voice. The pulse train generated by oscillator 61 is applied in parallel to a bank of $n+1$ monostable multivibrators 62–0 through 62–$n$, $n=3, 4, \ldots$ . Multivibrators 62–0 through 62–$n$, which may be of any well-known sort, are designed in conventional fashion to be triggered by the incoming pulses from oscillator 61 to produce pulses of fixed width at selected instants of time after receiving a triggering pulse from oscillator 61. These selected instants of time are chosen so that a pulse generated by multivibrator 62−$(i+1)$ follows a pulse generated by multivibrator 62–$i$, $i=0, 1, 2, \ldots, n$, at an interval equal to the predetermined spacing, $\tau$ between pulses in each period. By combining the pulses from multivibrators 61–0 through 61–$n$ in a suitable adder 63, a periodic pulse train is formed at the output terminal of adder 63 in which each period T contains $n+1$ pulses spaced apart at uniform intervals equal to $\tau$, as shown in FIG. 7.

It is to be understood that the spacing between pulses, $\tau$, must be arranged so that pulses in adjacent periods do not overlap despite variations in the length of the period, T. That is, the combined widths of the $n+1$ pulses in each period and the total amount of spacing between pulses in each period should not exceed the shortest anticipated period in order to avoid overlap between pulses in adjacent periods.

Although this invention has been described in terms of artificial larynges of the type shown in FIGS. 1, 2, and 6, it is to be understood that applications of the principles of this invention are not limited to this specific field, but may include related fields in which it is desired to employ a pulse train to generate sound having both a substantial output volume and an amplitude spectrum with one of the shapes described above. In addition, it is to be understood that in the field of artificial larynges the above-described embodiments are merely illustrative of the numerous arrangements that may be devised for the principles of this invention by those skilled in the art without departing from the spirit and scope of the invention.

What is claimed is:

1. An artificial larynx for introducing into a user's vocal tract artificial sound from which speech may be produced by said user which comprises
   means for generating a periodic train of pulses in which each period contains a predetermined plurality of $n$ pulses, $n=2, 3, \ldots$, and each period is substantially equal in duration to the average fundamental pitch period of the human voice, and
   transducer means responsive to said train of pulses for externally vibrating a portion of said user's throat wall in order to introduce artificial sound into said user's vocal tract.

2. An artificial larynx for introducing artificial sound into a user's vocal tract by externally vibrating a portion of said user's throat wall which comprises
   a pulse generator including
   a source of a periodic train of pulses having a predetermined plurality of $n$ pulses, $n=2, 3, \ldots$, in each period, and
   means under the control of said user for regulating said pulse train source so that the duration of each of said periods may be varied over a range of values corresponding to a selected range of pitch period durations of the human voice, and
   transducer means responsive to said train of pulses for externally displacing a portion of said user's throat wall.

3. An artificial larynx for introducing artificial sound into a user's vocal tract by externally vibrating a portion of said user's throat wall which comprises
   a pulse generator including
   a source of a periodic train of electrical pulses having a predetermined plurality of $n$ pulses, $n>2$, in each period, and
   means under the control of said user for regulating said pulse train source so that the duration of the period of said train of pulses may be varied to correspond to a predetermined range of pitch periods of the human voice,
   means supplied with said pulse train and under the control of said user for adjusting the amplitudes of the pulses in said pulse train produced by said pulse generator to adapt the output volume of the artificial sound introduced into said user's vocal tract by said artificial larynx to said user's acoustic environment, and
   electromagnetic transducer means responsive to said amplitude-adjusted train of pulses for externally displacing a portion of said user's throat wall.

4. An artificial larynx for introducing artificial sound into a user's vocal tract which comprises
   a pulse generator that includes
   a first oscillator for producing a first sequence of periodic pulses, each of said pulses having a predetermined, uniform width,
   a second oscillator synchronized with said first oscillator for producing a second sequence of periodic pulses in which the period of said second sequence of pulses in N times the period of said first sequence of pulses, $N=3, 4, 5, \ldots$, and in which the width of each pulse in said second sequence is substantially equal to $N-1$ periods of said first sequence,
   means under the control of said user for regulating the period of the first sequence of pulses produced by said first oscillator so that the period of said second sequence of pulses produced by said synchronized second oscillator corresponds to a selected fundamental pitch period of human voices,
   gating means provided with an input terminal, a control terminal, and an output terminal,
   means for applying said first sequence of pulses to said input terminal of said gating means, and
   means for applying said second sequence of pulses to said control terminal of said gating means so that there is developed at the output terminal of said gating means a third sequence of periodic pulses in which the period of said third sequence is equal to the period of said second sequence of pulses and in which each period of said third sequence contains $N-1$ pulses each having a width equal to the width of the pulses in said first sequence,
   means under the control of said user for adjusting the amplitudes of the pulses in said third sequence of pulses to adapt the output volume of the artificial sound introduced into said user's vocal tract by said artificial larynx to said user's acoustic environment,
   means for applying said third sequence of pulses to said amplitude adjusting means, and
   transducer means responsive to said amplitude adjusted third sequence of pulses for externally displacing a portion of said user's throat wall.

5. An artificial larynx for introducing artificial sound into a user's vocal tract by externally displacing said user's throat wall which comprises
   a pulse generator that includes
   a first astable multivibrator for producing first and second trains of periodic pulses of opposite polarities, each of said pulse trains having the same period and each pulse in each of said trains being of the same uniform width and amplitude,
   a second astable multivibrator synchronized with said first multivibrator for producing a third train of periodic pulses in which the period of said third pulse train is N times the period of said first and second pulse trains, $N=3, 4, 5, \ldots$, the width of each pulse in said third pulse train is substantially equal to $N-1$ periods of said first and second pulse trains, and the polarity of said third pulse train is the same as the polarity of said second pulse train and opposite to the polarity of said first pulse train,
   means under the control of said user for regulating the duration of the period of said first and second pulse trains produced by said first multivibrator so that the duration of the period of said third pulse train produced by said synchronized second multivibrator corresponds to a selected fundamental pitch period of human voices, and so that the spacing between pulses in each period of said third pulse train varies with changes in the duration of the period of said third pulse train,
   gating means provided with an input terminal, a control terminal, and an output terminal,
   means for applying said second pulse train to said input terminal of said gating means,
   means for applying said third pulse train to said control terminal of said gating means to develop at the output terminal of said gating means a fourth pulse train in which the period of said fourth pulse train is equal to the period of said third pulse train and in which each period of said fourth pulse train contains $N-1$ pulses each having a width, an amplitude, and a polarity identical with the width, amplitude, and polarity of each of said pulses in said second pulse train, means supplied with said fourth pulse train for increasing the amplitude of each pulse in said fourth pulse train by a factor of two, adding means provided with a first input terminal, a second input terminal, and an output terminal for developing at said output terminal an additive combination of the signals applied to said first and second input terminals, means for applying said first pulse train to said first input terminal of said adding means, and means for applying said fourth pulse train to said second input terminal of said adding means to develop at said output terminal of said adding means a fifth pulse train in which each period contains N pulses, the first $N-1$ of said pulses each having the same width, amplitude, and polarity as each of said pulses in said second pulse train, and the Nth of said pulses in each period of said fifth pulse train having the same width, amplitude, and polarity as each of the pulses in said first pulse train, means under the control of said user for adjusting the amplitudes of said pulses in said fifth pulse train to adapt the output volume of the artificial sound introduced into said user's vocal tract by said artificial larynx to said user's acoustic environment, means for applying said fifth pulse train to said amplitude adjusting means, and transducer means in circuit relation with said amplitude adjusting means for externally displacing a portion of said user's throat in response to said amplitude-adjusted fifth pulse train.

6. An artificial larynx for introducing artificial sound into a user's vocal tract which comprises a source of a train of periodic pulses in which each period of said pulse train contains a predetermined plurality of N pulses, $N>2$, wherein the spacing between the N pulses in each period is a selected constant that is independent of the length of said period, and wherein the length of said period of said pulse train is regulated by said user to correspond to a selected fundamental pitch period of human voices, means under the control of said user for adjusting the amplitude of said pulse train to adapt the output volume of said artificial sound to said user's acoustic environment, and transducer means for externally displacing said user's throat wall in response to said amplitude-adjusted pulse train.

7. Apparatus as defined in claim 6 wherein said source of a train of periodic pulses comprises an oscillator for generating a first periodic train of pulses, means under the control of said user for regulating said oscillator to adjust the length of the period of said first pulse train to correspond to a selected fundamental pitch period of human voices, means for connecting said period regulating means to said oscillator, a plurality of $n+1$ monostable multivibrators $n=1, 2, \ldots$, each of which is provided with a selected constant delay time independent of the period of said first pulse train so that in response to an incoming pulse each of said monostable multivibrators produces an output pulse of predetermined width at a predetermined time interval following said incoming pulse, wherein the output pulse produced by said $(n+1)$th multivibrator follows the output pulse produced by said $n$th multivibrator, $n=1, 2, \ldots$, at a selected uniform interval of time, $\tau$, that is independent of the period of said first pulse train, adding means provided with an output terminal and with $n+1$ input terminals in one-to-one correspondence with said $n+1$ multivibrators, means for simultaneously applying said first periodic train of pulses to each of said $n+1$ multivibrators, and means for applying the output pulses of each of said multivibrators to the corresponding input terminal of said adding means so that there is developed at the output terminal of said adding means a second train of periodic pulses having the same period as said first pulse train and in which each period of said second pulse train contains $n+1$ pulses each of which follows a preceding pulse at said selected uniform interval of time, $\tau$.

References Cited by the Examiner

UNITED STATES PATENTS

| | | | |
|---|---|---|---|
| 2,374,090 | 4/1945 | French | 179—1 |
| 3,072,745 | 1/1963 | Barney | 179—1 |

KATHLEEN H. CLAFFY, *Primary Examiner.*

R. MURRAY, *Assistant Examiner.*